United States Patent
Stonitsch et al.

(10) Patent No.: US 7,195,455 B2
(45) Date of Patent: Mar. 27, 2007

(54) APPLICATION OF HIGH STRENGTH TITANIUM ALLOYS IN LAST STAGE TURBINE BUCKETS HAVING LONGER VANE LENGTHS

(75) Inventors: Raymond Joseph Stonitsch, Simpsonville, SC (US); Alan Richard Demania, Niskayuna, NY (US); Kevin Joseph Barb, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 124 days.

(21) Appl. No.: 10/919,435

(22) Filed: Aug. 17, 2004

(65) Prior Publication Data

US 2006/0039794 A1 Feb. 23, 2006

(51) Int. Cl.
*F01D 5/14* (2006.01)
(52) U.S. Cl. .................... 415/200; 415/241 B
(58) Field of Classification Search ............... 420/420; 416/241 B, 241 R; 415/200
See application file for complete search history.

(56) References Cited

U.S. PATENT DOCUMENTS

| | | | |
|---|---|---|---|
| 5,351,395 A | 10/1994 | Crawmer et al. | |
| 5,393,200 A | 2/1995 | Dinh et al. | |
| 5,445,498 A | 8/1995 | Williams et al. | |
| 5,780,171 A | 7/1998 | Nissley et al. | |
| 5,839,267 A | 11/1998 | Schonewald et al. | |
| 6,127,044 A * | 10/2000 | Yamamoto et al. | 428/603 |
| 6,206,634 B1 * | 3/2001 | Doi et al. | 415/200 |
| 6,849,231 B2 * | 2/2005 | Kojima et al. | 420/417 |

OTHER PUBLICATIONS

European Search Report.

* cited by examiner

*Primary Examiner*—Edward K. Look
*Assistant Examiner*—Devin Hanan
(74) *Attorney, Agent, or Firm*—Nixon & Vanderhye

(57) ABSTRACT

A new high-strength titanium-based alloy bucket specifically suited for use as the last stage buckets in steam turbine engines having vane lengths of about 40 inches or greater and the method for forming such bucket. Exemplary buckets according to the invention are formed from a titanium-based alloy containing up to about 6.25% aluminum; (b) about to 3.5% vanadium; (c) about 2.25% tin, (d) about 2.25% zirconium, (e) about 1.75% molybdenum, (f) about 2.25% chromium, (g) about 0.7% silicon; and (h) about 2.3% iron, with the balance being titanium. After forming, the bucket can be heat treated to provide stress relief and then machined in a conventional manner.

8 Claims, 3 Drawing Sheets

APPLICATION OF HIGH STRENGTH TITANIUM ALLOYS IN LAST STAGE TURBINE BUCKETS HAVING LONGER VANE LENGTHS

BACKGROUND OF THE INVENTION

The present invention relates to high strength buckets for use in the last stage of steam turbine engines and to the method for manufacturing such high strength buckets. Specifically, the invention relates to the application of certain titanium-based alloys for use in making high strength, last stage turbine buckets having vane lengths of about 40 inches or greater.

It is generally recognized that the performance of a steam turbine engine is greatly influenced by the design and performance of later stage buckets operating at reduced steam pressures. Ideally, the last stage bucket should efficiently use the expansion of steam down to the turbine exhaust pressure, while minimizing the kinetic energy of the steam flow leaving the last stage.

The service requirements of steam turbine buckets can be complex and demanding. Last stage buckets, in particular, are routinely exposed to a variety of severe operating conditions, including the corrosive environments caused by high moisture and the carry-over from the boiler. Such conditions can lead to serious corrosion and pitting problems with the bucket material, particularly in longer, last stage turbine buckets having vane lengths of 40 inches or greater. Thus, for some time, last stage buckets for turbines have been the subject of repeated investigations and development work in an effort to improve their efficiency under harsh operating conditions since even small increases in bucket efficiency and life span can result in significant economic benefits over the life of a steam turbine engine.

Last stage turbine buckets are exposed to a wide range of flows, loads and strong dynamic forces. Thus, from the standpoint of mechanical strength and durability, the primary factors that affect the final bucket profile design include the active length of the bucket, the pitch diameter and the operating speed in the operative flow regions. Damping, bucket fatigue and corrosion resistance of the materials of construction at the maximum anticipated operating conditions also play an important role in the final bucket design and method of manufacture.

The development of larger last stage turbine buckets, e.g., those with vane lengths of about 40 inches or more, poses additional design problems due to the inertial loads that often exceed the strength capability of conventional bucket materials such as Ti6Al-4V and iron-based alloys. Steam turbine buckets, particularly last stage buckets with longer vanes, experience higher tensile loadings and thus are subject to cyclic stresses which, when combined with a corrosive environment, can be very damaging to the bucket over long periods of use. In addition, the steam in the last stages normally is "wet," i.e., containing a higher amount of saturated steam. As a result, water droplet impact erosion of the bucket material often occurs in the last stage. Such erosion reduces the useable service life of the bucket and the efficiency of the steam turbine as a whole.

In the past, it has been difficult to find bucket materials capable of meeting all of the mechanical requirements for different end use applications, particularly mechanical designs in which longer vane buckets, i.e., those having vane lengths about 40 inches or more, have been employed. Invariably, the longer buckets have increased strength requirements and, as noted above, suffer from even greater erosion and pitting potential. The higher stresses inherent in longer vane designs also increase the potential for stress corrosion cracking at elevated operating temperatures because the higher strength required in the bucket material tends to increase the susceptibility to stress cracking at operating temperatures at or near 400° F. The effects of pitting corrosion and corrosion fatigue also increase with the higher applied stresses in last stage buckets having longer vane lengths. Many times, an alloy selected to satisfy the basic mechanical design requirements of other turbine stages simply will not meet the minimum mechanical strength and erosion resistance requirements of last stage buckets.

Previous approaches to solving the problems with longer vane lengths in last stage turbine buckets vary widely, depending on the end use requirements. In some cases, where the service demands are less severe, a single bucket material may be acceptable. However, in order to increase erosion resistance, the bucket normally requires hardening through localized heat treatment (e.g., flame or induction hardening) at the leading edge to provide additional erosion resistance. Alternatively, an erosion resistant shielding material (such as stellite) can be attached to the bucket by brazing, gas tungsten arc or electron beam welding. These prior art physical attachment methods almost invariably lead to some degree of degradation in the weld heat affect zone over time, and thus the bucket may ultimately fail at those points. In addition, the risk of defective welds always exists and can result in costly scrapping of entire bucket assemblies in some cases.

Another known method of manufacturing or repairing steam turbine buckets involves welding an insert to a leading edge of the bucket blade and then hardening a part of the insert to provide a leading outer edge with a hardened surface. Again, however, the hardening step normally does not extend as far as the junction between the insert and the blade itself. Thus, a portion of the insert can remain unhardened and vulnerable to premature failure or erosion under harsh operating conditions.

Commonly-owned U.S. Pat. No. 5,351,395 discloses a method for providing a bi-metallic structure that satisfies many of the requirements for highly stressed last stage buckets used in steam turbines. The method described in the '395 patent includes attaching an erosion resistant insert material, with both the bucket and insert material being in a near optimum weldability condition. The bi-metallic assembly is heat treated after welding to optimize bucket properties without significant distortion. The insert material can also be hardened after machining (by flame hardening or other conventional methods) to provide improved erosion resistance. It has been found, however, that the bi-metallic structure disclosed in the '395 patent does not solve all of the pitting and corrosion problems inherent in last stage turbine buckets, particularly those with vane lengths of about 40 inches or greater.

The present invention represents a significant improvement over earlier last-stage bucket designs using bi-metallic structures by providing an integral, i.e., unitary, metallic design for buckets having longer vane lengths. In particular, the invention utilizes a high strength titanium alloy particularly suited for vane lengths of about 40 inches or greater. As such, the application of the alloys is particularly useful for last stage steam turbine buckets without the need for additional shielding materials or vane inserts as used in earlier designs. Buckets manufactured in accordance with the invention also show significant improvement in the ability to accommodate increased stresses and loads of last stage steam turbine buckets over longer periods of time without significant deterioration, erosion or stress cracking at elevated temperatures, i.e., operating temperatures at or near about 400° F.

It has now been found that certain lightweight, high strength titanium-based alloys can be used to reduce and/or control the stresses inherent in longer last stage buckets that operate at temperatures at or near 400° F., particularly buckets having vane lengths of about 40 inches or more. Longer vane buckets using the titanium-based alloys described herein exhibit higher strength and improved erosion resistance. Exemplary titanium-based alloys according to the invention have a minimum 145 ksi room temperature ultimate tensile strength, a 130 ksi 0.2% room temperature yield strength; 125 ksi ultimate tensile strength and 110 ksi 0.2% yield strength at about 400° F. The preferred titanium-based alloys are also more reliable and cost-effective when used in buckets with longer vane lengths as compared to other conventional alloys, such as Ti6 Al-4V.

In its broader aspects, the present invention also includes a new process of manufacturing an integral, unitary steam turbine bucket comprising titanium alloys that are approximately 50% lighter than iron base alloys typically used in steam turbine applications. This significant reduction in overall weight from earlier bucket designs represents an important potential cost savings, both in equipment manufacture and steam turbine efficiency for buckets having vane lengths of about 40 inches or greater. The strength of the titanium alloys used to form buckets according to the invention has also been found equal to or greater than conventional iron based alloys.

Additional objects and advantages of the invention will become apparent from the detailed description that follows.

DETAILED DESCRIPTION OF THE INVENTION

Figure 1:
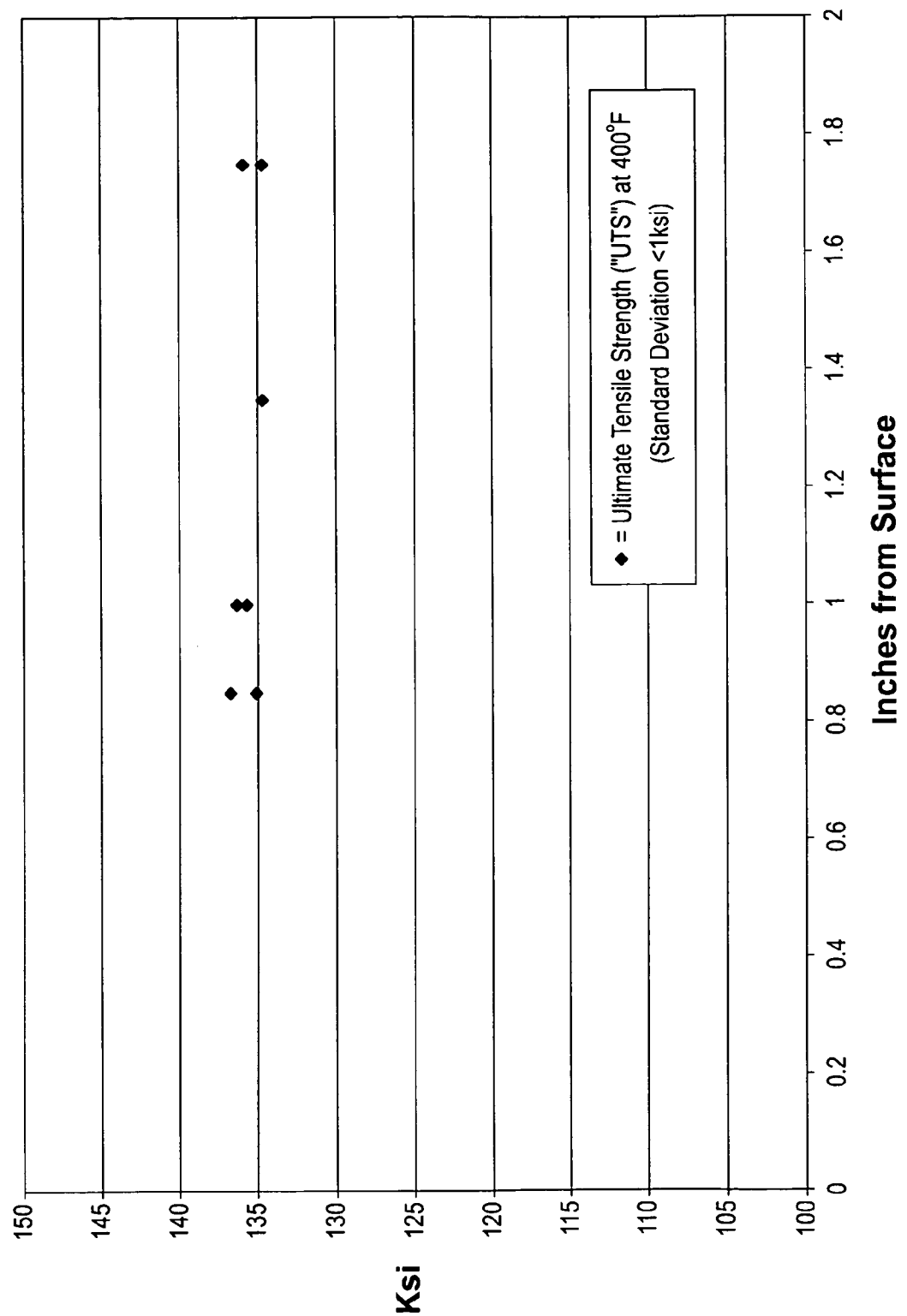
FIG. 1 is graphical representation of the results of strength testing performed on exemplary titanium alloy compositions used for longer vane last stage turbine buckets according to the invention.

Titanium-based alloys according to the invention have the exemplary weight percentages shown below in Table I:

bucket profile and specific alloy employed, such as the active length of the bucket, the pitch diameter and the operating speed of the bucket in the operative flow regions. Damping, bucket fatigue and corrosion resistance of the alloy at the maximum anticipated operating conditions also play a role in the final bucket design using titanium-based alloys falling within the above preferred composition ranges. Exemplary profiles for longer vane last stage buckets capable of being formed with titanium alloys according to the invention are described in commonly-owned U.S. Pat. No. 5,393,200, entitled "Bucket for the Last Stage of Turbine."

After formation, each bucket according to the invention is stress relieved and the bucket surfaces machined to the finished profile using conventional finishing and heat treatment steps. Various exemplary buckets having vane lengths of about 40 inches or greater have been subjected to conventional mechanical strength and corrosion resistance tests within the nominal and maximum anticipated operating temperatures for last stage steam turbines. The titanium-based alloy materials used in buckets according to the invention exhibited improved corrosion resistance and better-than-average strength characteristics.

An exemplary process for manufacturing a titanium-based steam turbine bucket according to the invention includes the following steps. Initially, a titanium billet comprised of an alloy composition as described above is formed and forged into a bucket using a conventional screw press, hammer forging and/or hydraulic press. Optionally, the forged bucket can be heat treated and quenched to provide stress relief and to develop the mechanical strength properties. Depending on the specific end use application, the bucket can also be aged using conventional means and then machined into a final operational configuration (typically with the machining being performed on all sides, i.e., 360 degrees).

While the above process has been developed for longer buckets, e.g., last stage steam turbine buckets having vane lengths of about 40 inches or more, the process can be adjusted using varying titanium alloy compositions within the above-noted composition ranges, depending on the specific bucket design and end use requirements.

TABLE I

| Al | V | Sn | Zr | Mo | Cr | Si | Fe | Ti |
|---|---|---|---|---|---|---|---|---|
| 3% to 6.25% | Up to 3.5% | Up to 2.25% | Up to 2.25% | 1.75% to 5.0% | Up to 2.25% | Up to 0.7% | Up to 2.3% | Balance |

The titanium-based alloys used to form buckets according to the invention, i.e., alloys used for buckets having vane lengths of at least about 40 inches, exhibit a minimum ultimate tensile strength at room temperature of 145 ksi; 0.2 percent yield strength of 130 ksi at room temperature; minimum ultimate tensile strength at 400° F. of 125 ksi; and a minimum 0.2 percent yield strength of 110 ksi at 400° F. The preferred alloys display either a beta or alpha beta structure and achieve a minimum fracture toughness of about 50 ksi root square inches.

Various steam turbine buckets having vane lengths of about 40 inches were formed in accordance with the invention using the above titanium alloy composition ranges. As noted above, a number of design factors can affect the final Table II below summarizes the mechanical strength testing done on exemplary high strength titanium allow compositions that qualify for use on longer vane, last stage steam turbine buckets according to the present invention.

TABLE II

| Test No. | Test Direction | Temp. ° F. | UTS KSI | 0.2% YS KSI | Elong % | RA % | Modulus MSI |
|---|---|---|---|---|---|---|---|
| T11 | Axial | 75 | 158.1 | 142 | 16 | 40 | 16.8 |
| T12 | Axial | 75 | 157.9 | 141.5 | 17 | 37 | 16.8 |
| T9 | Tangential | 75 | 157.9 | 142 | 12 | 29 | 17.4 |
| T10 | Tangential | 75 | 157.9 | 141.8 | 14 | 24 | 17 |

TABLE II-continued

| Test No. | Test Direction | Temp. °F. | UTS KSI | 0.2% YS KSI | Elong % | RA % | Modulus MSI |
|---|---|---|---|---|---|---|---|
| T15 | Axial | 75 | 170.5 | 151.5 | 13 | 36 | 17.2 |
| T16 | Axial | 75 | 170.5 | 151 | 12 | 37 | 17.3 |
| T13 | Tangential | 75 | 169.7 | 149.5 | 11 | 25 | 17.5 |
| T14 | Tangential | 75 | 171.1 | 150.8 | 12 | 30 | 16.4 |
| T3 | Axial | 75 | 155.6 | 136.6 | 16 | 40 | 16.2 |
| T4 | Axial | 75 | 154.8 | 136 | 14 | 37 | 16.8 |
| T1 | Tangential | 75 | 161.4 | 145.9 | 14 | 40 | 17.9 |
| T2 | Tangential | 75 | 160.6 | 145.2 | 14 | 40 | 17.6 |
| T7 | Axial | 75 | 177 | 158.2 | 12 | 38 | 16.7 |
| T8 | Axial | 75 | 179.2 | 159.5 | 11 | 35 | 16.7 |
| T5 | Tangential | 75 | 183.3 | 165.7 | 10 | 33 | 17.2 |
| T6 | Tangential | 75 | 187.2 | 167.4 | 10 | 32 | 17.6 |
| T63 | Axial | 75 | 164 | 148.3 | 15 | 32 | 16.6 |
| T64 | Axial | 75 | 164.7 | 148 | 15 | 35 | 16.6 |
| T61 | Tangential | 75 | 168.8 | 151.9 | 13 | 27 | 16.6 |
| T62 | Tangential | 75 | 168.3 | 151.5 | 12 | 28 | 16.4 |
| T67 | Axial | 75 | 182.9 | 159.9 | 10 | 25 | 16.9 |
| T68 | Axial | 75 | 182.7 | 159 | 10 | 26 | 16.4 |
| T65 | Tangential | 75 | 201.3 | 169.3 | 6 | 19 | 16.9 |
| T66 | Tangential | 75 | 197.7 | 169.3 | 8 | 19 | 16.6 |
| T27 | Axial | 400 | 135.9 | 110.3 | 18 | 46 | 16 |
| T28 | Axial | 400 | 134 | 109 | 17 | 43 | 15.8 |
| T49 | Axial | 400 | 134.7 | 110.3 | 17 | 40 | 16.3 |
| T50 | Axial | 400 | 135.7 | 110.3 | 16 | 45.5 | 16.2 |
| T51 | Axial | 400 | 136.3 | 111 | 17 | 43.5 | 15.8 |
| T52 | Axial | 400 | 136.7 | 109.4 | 16 | 41 | 15.1 |
| T53 | Axial | 400 | 135.1 | 109.5 | 17 | 47 | 16.1 |
| T25 | Tangential | 400 | 133.8 | 109.5 | 14 | 35.5 | 15.5 |
| T26 | Tangential | 400 | 133.8 | 108.5 | 16 | 35 | 16 |
| T47 | Tangential | 400 | 134.6 | 109.5 | 16 | 40 | 15.3 |
| T48 | Tangential | 400 | 136.5 | 109.5 | 15 | 38.5 | 15.4 |
| T31 | Axial | 400 | 147.1 | 121.9 | 18 | 53.5 | 15.2 |
| T32 | Axial | 400 | 147.5 | 119.8 | 18 | 51.5 | 16.4 |
| T56 | Axial | 400 | 149 | 123.3 | 18 | 52 | 16.7 |
| T57 | Axial | 400 | 152.3 | 125.1 | 14 | 44 | 15.2 |
| T58 | Axial | 400 | 151.2 | 126.2 | 16 | 53 | 15.5 |
| T59 | Axial | 400 | 153.7 | 127.9 | 16 | 47.5 | 16.7 |
| T60 | Axial | 400 | 150.9 | 125.8 | 16 | 45.5 | 15.1 |
| T29 | Tangential | 400 | 144.5 | 117.2 | 15 | 41 | 15.3 |
| T30 | Tangential | 400 | 147.3 | 119 | 14 | 39.5 | 15.9 |
| T54 | Tangential | 400 | 160.3 | 135.1 | 14 | 43 | 16.3 |
| T55 | Tangential | 400 | 153.3 | 128 | 15 | 49.5 | 16.2 |
| T19 | Axial | 400 | 129 | 100.1 | 17 | 45 | 15 |
| T20 | Axial | 400 | 132.6 | 103.8 | 16 | 51.5 | 14.9 |
| T35 | Axial | 400 | 128.1 | 100.3 | 16 | 50 | 16.4 |
| T36 | Axial | 400 | 156.2 | 123.1 | 13 | 46.5 | 14.9 |
| T37 | Axial | 400 | 157 | 126.5 | 14 | 44 | 15.2 |
| T38 | Axial | 400 | 155.3 | 123.3 | 12 | 45 | 14.5 |
| T39 | Axial | 400 | 128.7 | 100.2 | 16 | 53 | 15.4 |
| T17 | Tangential | 400 | 135.2 | 108.2 | 14 | 48.5 | 16.1 |
| T18 | Tangential | 400 | 133.5 | 107.9 | 17 | 55.5 | 16.4 |
| T33 | Tangential | 400 | 132 | 109.9 | 17 | 57 | 15.2 |
| T34 | Tangential | 400 | 132 | 105.8 | 17 | 55.5 | 16 |
| T23 | Axial | 400 | 150.8 | 122.3 | 15 | 50.5 | 15.9 |
| T24 | Axial | 400 | 151.9 | 123.2 | 13 | 49.5 | 14.9 |
| T42 | Axial | 400 | 155.8 | 125.8 | 14 | 47 | 14.6 |
| T43 | Axial | 400 | 155.9 | 125.9 | 13 | 48.5 | 15.6 |
| T44 | Axial | 400 | 155.8 | 127.9 | 12 | 44.5 | 15.1 |
| T45 | Axial | 400 | 157.8 | 126.5 | 11 | 34.5 | 14.7 |
| T46 | Axial | 400 | 156.7 | 123.9 | 13 | 47.5 | 15.6 |
| T40 | Tangential | 400 | 162.9 | 131.1 | 12 | 43 | 16.1 |
| T41 | Tangential | 400 | 160.2 | 130.6 | 13 | 48 | 16 |
| T21 | Tangential | 400 | 153.4 | 126.9 | 12 | 49.5 | 16.7 |
| T22 | Tangential | 400 | 157.4 | 129.6 | 13 | 48 | 15.8 |
| T71 | Axial | 400 | 131.4 | 106.7 | 16 | 38.5 | 15.3 |
| T72 | Axial | 400 | 131.7 | 106.4 | 16 | 42.5 | 14 |
| T75 | Axial | 400 | 132.8 | 106.8 | 16 | 41 | 14.6 |
| T76 | Axial | 400 | 134.6 | 108.6 | 18 | 43 | 15 |
| T77 | Axial | 400 | 131.9 | 108.1 | 17 | 42 | 15.7 |
| T78 | Axial | 400 | 132 | 106.8 | 16 | 40 | 14.8 |
| T79 | Axial | 400 | 134.5 | 108.9 | 18 | 42.5 | 14.4 |
| T69 | Tangential | 400 | 134.5 | 113 | 16 | 40.5 | 16.5 |
| T70 | Tangential | 400 | 134.3 | 112.4 | 16 | 39.5 | 16 |
| T73 | Tangential | 400 | 135.4 | 112.8 | 16 | 46.5 | 15.3 |
| T74 | Tangential | 400 | 134.7 | 113.5 | 15 | 48 | 17 |
| T82 | Axial | 400 | 148.2 | 118.5 | 15 | 38 | 15.2 |
| T83 | Axial | 400 | 148.2 | 119.3 | 15 | 37.5 | 16.4 |
| T86 | Axial | 400 | 149.8 | 115.8 | 14 | 37 | 15.5 |
| T87 | Axial | 400 | 151.6 | 116.3 | 14 | 37.5 | 14.4 |
| T88 | Axial | 400 | 152.3 | 115.1 | 13 | 35 | 14.9 |
| T89 | Axial | 400 | 150.6 | 116.2 | 14 | 35 | 15.5 |
| T90 | Axial | 400 | 150.9 | 115.9 | 12 | 35.5 | 15.1 |
| T80 | Tangential | 400 | 165.7 | 124.7 | 10 | 29.5 | 15.6 |
| T81 | Tangential | 400 | 162.1 | 124.8 | 12 | 38 | 15 |
| T84 | Tangential | 400 | 165.3 | 126.1 | 11 | 33 | 15.1 |
| T85 | Tangential | 400 | 164.9 | 122.9 | 12 | 32 | 15.7 |

Referring to Table II, column 1 (far left) identifies the assigned test number; column 2 states the test direction, i.e., whether it was conducted in the "axial" direction along the longitudinal axis of the test bar or through a cross section of the bar at a 90 degree angle ("tangential" to the test bar); column 3 shows the maximum measured temperature of the bar during each test; column 4 lists the ultimate tensile strength in thousands of pounds per square inch; column 5 identifies the yield strength 0.2 percent offset for each sample in KSI; column 6 shows the percent elongation for each sample tested; column 7 lists the percent area of reduction for each sample; and column 8 shows the modulus of elasticity in millions of pounds per square inch for each sample tested.

The various strength values shown in Table II indicate that titanium alloy compositions used to form longer vane buckets according to the invention, i.e., those having the weight percentage constituents falling within the ranges described above, show significant improvement in the ability of the alloys to withstand the type of increased stresses and loads imposed on last stage steam buckets having vane lengths about 40 inches or greater but without deterioration or stress cracking.

FIG. 1 of the drawings is a graphical representation of the results of ultimate tensile strength tests performed on exemplary titanium alloy compositions as used according to the invention at varying distances from the surface of the tested sample. As FIG. 1 illustrates, the ultimate tensile strength in KSI at 400° F. for the tested alloys remained essentially constant at varying distances from the surface of the sample, i.e., at distances of about 0.9, 1.0, 1.4 and 1.8 inches from the alloy surface.

Figure 2:
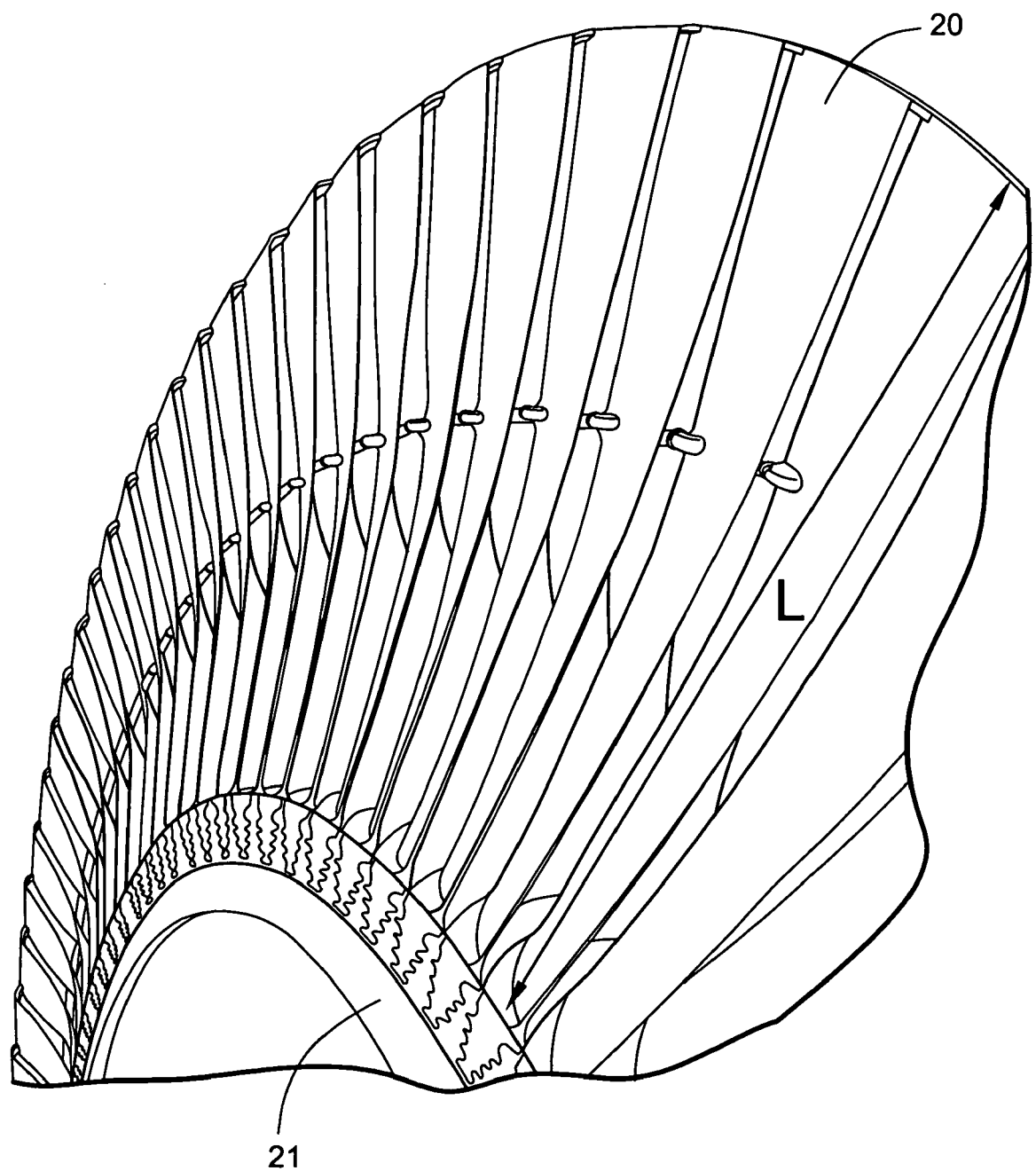
FIG. 2 is a perspective view of multiple last stage steam turbine buckets having the longer vane lengths and composition as described herein, with the buckets shown as attached to a steam turbine wheel.
Figure 3:
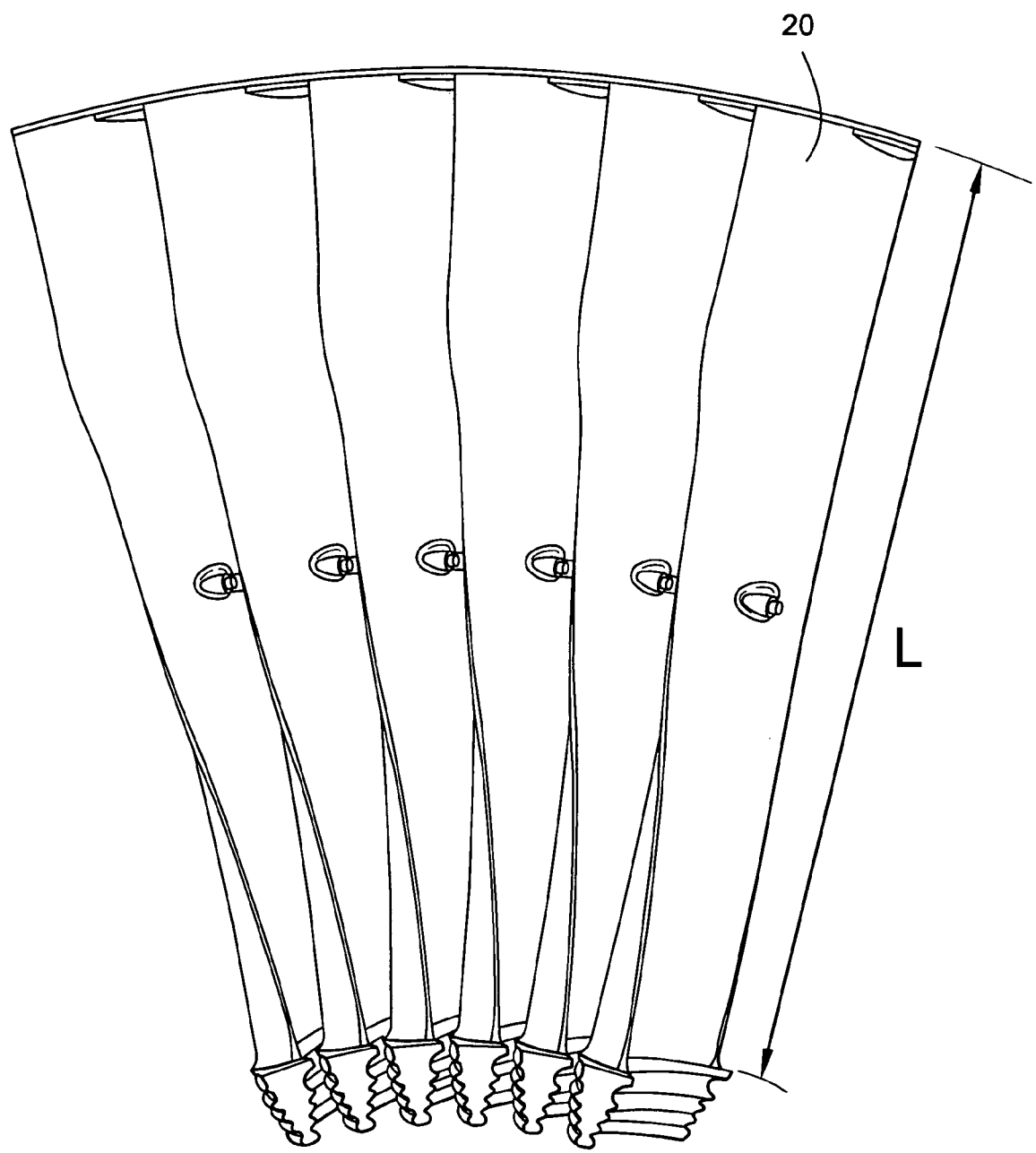
FIG. 3 is a front elevation view of exemplary steam turbine buckets in accordance with the invention.

FIG. 2 of the drawings is a perspective view of a portion of a steam turbine wheel (shown as 21) depicting a plurality of exemplary last stage steam turbine buckets (shown generally as 20) having the composition and longer vane length L as described above. FIG. 3 is a front elevation view of multiple steam turbine buckets in accordance with the invention as described herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bucket for use in the last stage of a steam turbine engine, said bucket being formed with a vane length of at least about 40 inches and comprising a titanium-based alloy having between about 3% and 6.25% by weight aluminum, up to 3.5% vanadium, up to 2.25% tin, up to 2.25% zirconium, between about 1.75% and 5.0% molybdenum, up to 2.25% chromium, up to 0.7% silicon and up to 2.3% iron, with the balance being titanium.

2. A bucket according to claim 1, wherein said titanium-based alloy exhibits strength characteristics of about 145 ksi room temperature ultimate tensile strength; about 130 ksi 0.2% room temperature yield strength; about 125 ksi ultimate tensile strength; and about 110 ksi 0.2% yield strength at 400° F.

3. A bucket according to claim 1, wherein said titanium-based alloy used to form said bucket has either a beta or alpha beta structure and has a minimum fracture toughness of about 50 ksi root square inches.

4. In a steam turbine engine having a turbine wheel, a plurality of buckets arranged about said turbine wheel and a last stage bucket with a vane length of about 40 inches or greater comprising a titanium-based alloy according to claim 1.

5. A titanium-based alloy composition for use in forming last stage steam turbine buckets having vane lengths of at least about 40 inches, said titanium-based alloy composition comprising between about 3% and 6.25% by weight aluminum, up to 3.5% vanadium, up to 2.25% tin, up to 2.25% zirconium, 1.75 to 5.0% molybdenum, about 2.25% chromium, between about 0.7% silicon and up to 2.3% iron, with the balance being titanium.

6. A titanium-based alloy composition for use in forming last stage steam turbine buckets according to claim 5, wherein said alloy exhibits strength characteristics of at least about 145 ksi room temperature ultimate strength; about 130 ksi 0.2% room temperature yield strength; about 125 ksi ultimate tensile strength; and about 110 ksi 0.2% yield strength at 400° F.

7. A titanium-based alloy composition for use in forming last stage steam turbine buckets according to claim 5, wherein said composition has either a beta or alpha beta structure and has a minimum fracture toughness of about 50 ksi root square inches.

8. A method for manufacturing a last stage turbine bucket for use in a steam turbine engine, comprising the steps of:

(a) forming a steam turbine bucket having a vane length of at least about 40 inches using a titanium-based alloy having between about 3% and 6.25% by weight aluminum, up to 3.5% vanadium, up to 2.25% tin, up to 2.25% zirconium, between about 1.75% and 5.0% molybdenum, up to 2.25% chromium, up to 0.7% silicon and up to 2.3% iron, with the balance being titanium;

(b) stress relieving said bucket using heat treatment; and (c) machining the surfaces of said bucket.

* * * * *